US008883677B2

(12) United States Patent
Windhoevel

(10) Patent No.: US 8,883,677 B2
(45) Date of Patent: Nov. 11, 2014

(54) SOIL IMPROVER AND USE THEREOF

(75) Inventor: Volker Windhoevel, Borken (DE)

(73) Assignee: Arpolith GmbH, Borken (DE)

( * ) Notice: Subject to any disclaimer, the term of this patent is extended or adjusted under 35 U.S.C. 154(b) by 679 days.

(21) Appl. No.: 12/742,180

(22) PCT Filed: Nov. 7, 2008

(86) PCT No.: PCT/EP2008/009390
§ 371 (c)(1),
(2), (4) Date: May 10, 2010

(87) PCT Pub. No.: WO2009/059775
PCT Pub. Date: May 14, 2009

(65) Prior Publication Data
US 2010/0275664 A1   Nov. 4, 2010

(30) Foreign Application Priority Data

Nov. 8, 2007 (DE) .......................... 10 2007 053 622
Nov. 22, 2007 (DE) .......................... 10 2007 056 264

(51) Int. Cl.
| B01J 20/26 | (2006.01) |
| B01J 20/22 | (2006.01) |
| B01J 20/24 | (2006.01) |
| B01J 20/02 | (2006.01) |
| B01J 20/04 | (2006.01) |
| B01J 20/06 | (2006.01) |
| B01J 20/10 | (2006.01) |
| B01J 20/12 | (2006.01) |
| C05G 3/04 | (2006.01) |
| C09K 17/40 | (2006.01) |

(52) U.S. Cl.
CPC .. *C09K 17/40* (2013.01); *C05G 3/04* (2013.01)
USPC ........... 502/402; 502/400; 502/401; 502/404; 71/27

(58) Field of Classification Search
USPC ................................. 502/400, 401, 402, 404
See application file for complete search history.

(56) References Cited

U.S. PATENT DOCUMENTS

| 2004/0011102 A1* | 1/2004 | Sears ................................. 71/25 |
| 2004/0059054 A1* | 3/2004 | Lopez et al. .................. 525/54.3 |
| 2005/0070616 A1* | 3/2005 | Champ et al. .................... 521/50 |
| 2005/0159315 A1* | 7/2005 | Doane et al. .................. 504/360 |

FOREIGN PATENT DOCUMENTS

| CA | 2635839 | * | 7/2007 | ............. C08L 51/02 |
| DE | 4123889 | * | 3/1992 | ................ C08F 6/00 |
| JP | H06-313115 | * | 11/1994 | ............ C08L 101/00 |

OTHER PUBLICATIONS

Chaplin, Martin, "Carboxymethylcellulose (CMC)." London South Bank Univ., available online as of Oct. 12, 2003. Viewed Oct. 12, 2012 at http://web.archive.org/web/20031012044102/http://www.lsbu.ac.uk/water/hycmc.html.*
Cytec.com, "Cytec Careers—Company Profile." (c) 2012 Cytec. Viewed Oct. 12, 2012 at http://www.cytec.com/careers/company-profile.aspx#history.*
"Serial No./Case ID # 73604935." USPTO TSDR Case Viewer. Available online as of May 18, 2007. Viewed Oct. 12, 2012 at http://tsdr.uspto.gov/documentviewer?caseId=sn73604935&docId=SPE20070518214804.*
Brooks, David W., "Hemiacetals, Acetals and the Aldol Reaction." Univ. of Nebraska, Lincoln (published Feb. 7, 1996). Viewed Apr. 24, 2013 at http://dwb.unl.edu/Teacher/NSF/C10/C10Links/www.chem.wsu.edu/chem102/102-AcetalAldol.html.*

* cited by examiner

*Primary Examiner* — Stuart Hendrickson
*Assistant Examiner* — Daniel Berns

(57) ABSTRACT

The invention relates to a soil improver which is suitable especially for increasing the water absorption and/or water storage of soils, said soil improver comprising a water-swellable matrix material based on at least one organic polymer, inorganic solid particle having been added to said matrix material, and said organic polymer of said water-swellable matrix material comprising carbohydrate-based structural units, especially carbohydrate-based functional groups.

19 Claims, No Drawings

SOIL IMPROVER AND USE THEREOF

CROSS-REFERENCES TO RELATED APPLICATIONS

This application is a National Stage filing of International Application PCT/EP 2008/009390, filed Nov. 7, 2008, claiming priority to German Applications DE 10 2007 053 622.6 filed Nov. 8, 2007, and DE 10 2007 056 264.2 filed on Nov. 22, 2007, entitled "Soil Improver and Use Thereof." The subject application claims priority to PCT/EP 2008/009390, and to German Applications DE 10 2007 053 622.6 and DE 10 2007 056 264.2 and incorporates all by reference herein, in their entirety.

BACKGROUND OF THE INVENTION

The present invention relates to a soil improver (soil auxiliary substance) according to the preamble of claim 1 and also to the use thereof, in particular for improving soil quality, more particularly for increasing the water uptake capacity and/or water storage capacity of soils and/or for the loosening (e.g., aeration) of soils (e.g., in agriculture, in viticulture, horticulture, and landscaping, for sports, golf, gardening, lawn, and riding areas, for green roofing, for land consolidation, in particular on slopes, for combating desertification in arid regions, for plant growth promotion and regulation, or the like).

The prior art has disclosed numerous soil improvers. Oftentimes, however, they do not possess the desired efficiency, particularly not in relation to a promotional effect on vegetative growth. Furthermore, sufficient biocompatibility is not always ensured.

Thus DE 295 16 675 U1 describes a water storage soil auxiliary which comprises a hydrogel, alginate, and, if desired, clay. The material described therein does not contain sufficient amounts of plant nutrients. Nor is any delayed, long-term provision of plant nutrients possible. Moreover, hydrogels do not always have a sufficient water uptake capacity and water storage capacity, and, furthermore, in larger amounts they result in deficient aeration of the soil, producing the potential for the vegetation in question to suffer root rot.

Also given consideration in the prior art, furthermore, for the preparation of soil improvers have been materials known as superabsorbent polymer (SAP) materials. These superabsorbent polymers (SAP) have to date been used, on account of their high swelling properties and their water uptake capacity, with preference in the hygiene industry, as for example in diapers, sanitary towels, etc.

DE 101 30 427 A1 and its correspondent WO 03/000621 A1, and also DE 10 2005 021 221 A1 and its correspondent WO 2006/119828 A1, each describe porous, water-swellable polymers having a sponge structure and superabsorbent properties, in particular on the basis of polyacrylic acid, together with inorganic and organic ballast substances and adjuvants, and are said to be suitable as soil improvers. The organic polymers are based in particular on homopolymers or copolymers of acrylic acid with free carboxylic acid functions, the materials described therein being said to have water storage properties and consequently to find use inter alia as soil improvers. However, since the compositions described therein possess free carboxyl groups, their alkali susceptibility is relatively high, and this leads to reduced swellability and water uptake. Moreover, the material described therein is not in all cases sufficiently biocompatible and bioavailable, and in particular is not sufficiently rapidly degradable. Furthermore, on long-term use in soils, the material described therein has a proclivity to unwanted gelling, which is a hindrance in relation to plant growth, and in particular may damage root formation. Where additives are added, especially plant nutrients, there is no long-term effect, in particular no delayed release, since these substances are only separately added to the mixture described therein, but not effectively bonded thereto. In addition, the swelling behavior is not reversible under all conditions, and so stored water cannot be readily delivered from the material described therein to the plants again. Finally, the production methods described therein result in a relatively high residual monomer content in the end product, which is detrimental in relation to vegetative growth in the context of a soil improver utility.

BRIEF SUMMARY OF THE INVENTION

It is an object of the present invention, therefore, at least largely to avoid, or else at least to attenuate, the disadvantages of the prior art outlined at the outset.

It is a further object of the present invention to provide a product which is new and improved over the existing products of the prior art and their applications, and which is capable on the one hand of uniting the different ingredients, in particular both solid and liquid components, with one another, acting so to speak as a binder, to form a homogenized product, and, on the other hand, of maintaining the water storage medium ability.

It is yet a further object of the present invention to provide a soil improver which has good biological degradability and which, when the hydrophilic character is increased, at the same time exhibits improved water uptake and/or water storage ability or swellability.

To achieve the objects outlined above, the present invention therefore proposes a soil improver according to claim 1; further, advantageous embodiments are subject matter of the respective dependent claims.

Further subject matter of the present invention is the use of the soil improver of the invention, as defined in the relevant use claims.

DETAILED DESCRIPTION OF THE INVENTION

The present invention—in accordance with a first aspect of the present invention—accordingly provides a soil improver (soil auxiliary substance) which is suitable in particular for increasing the water uptake capacity and/or water storage capacity of soils, the soil improver having a water-swellable matrix material based on at least one organic polymer, with inorganic particulate solids added to the matrix material; the soil improver of the invention is characterized in that the organic polymer of the water-swellable matrix material comprises carbohydrate-based structural units, more particularly carbohydrate-based functional groups.

The modification of the organic polymer structure by means of carbohydrate-based structural units has the effect, first, of significantly improving the biocompatibility, in particular the bioavailability and/or biological degradability, of the soil improver of the invention. It also achieves, second, as will be further observed below, a distinct simplification or improvement in production terms, since in the context of the present invention there is no need for specific additives as part of the production operation, in particular the polymerization operation, and this is important, particularly in the context of industrial implementation, and leads to significant savings and simplifications in the course of the process. Furthermore, it also has the effect of positively influencing and significantly improving the water uptake capacity and water storage capacity and also the swellability.

The spongelike to highly porous form of the polymeric matrix material, moreover, achieves a positive loosening behavior in relation to the soils to be treated, in particular a significant aeration (The corresponding aeration quotient or coefficient, with addition of only 1% by weight of the soil improver of the invention to a soil for treatment, is at least 5%, in particular at least 7.5%, preferably at least 10%.).

In other words, then, the present invention relates to an inorganic composite or hybrid material which is modified with a carbohydrate-based structural unit and in that way produces improved biocompatibility, more particularly bioavailability and biological degradability, in particular in view of the fact that the carbohydrate component is bonded directly to the organic polymer, meaning that said component is provided with a time delay or in retarded form, through degradation of the organic polymer, when used in soils, as a plant nutrient. Consequently, there is no need for additional, separate carbohydrate components to be added as a separate plant nutrients component to the soil improver of the invention, although the invention does not additionally rule out such addition.

In the context of the present invention it is preferred if the organic polymer is crosslinked, in particular structurally crosslinked, in form. This produces improved structural stability on the part of the organic polymer used as matrix material, and in particular an improved handleability on the part of the soil improver of the invention, particularly in the context of its incorporation into soils. The crosslinking of the organic polymer used in accordance with the invention may be accomplished by the skilled person using measures which are known per se, more particularly via crosslinking by means of difunctional crosslinkers, such as diols (e.g., butane-1,4-diol diacrylate), for example, in which case the crosslinkers are added to the polymerization feedstock when the polymer is prepared, in particular toward the end of the polymerization. To prevent excessive crosslinking of the organic polymer used, the crosslinker content, relative to the organic polymer, ought to be present in the quantity range from 0.01% to 20% by weight, in particular 0.1% to 10% by weight, preferably 0.2% to 5% by weight, in the organic polymer that ultimately results.

The carbohydrate-based structural units are advantageously bonded, more particularly chemically bonded, to the organic polymer. This may be accomplished, for example, by means of grafting or condensation, more particularly esterification. This ensures that, when the soil improver of the invention is used, a long-term bioavailability is ensured, more particularly the carbohydrate-based constituent is degraded or released with a time delay or in retarded form, and so the resultant plant nutrients are available long term for plant feeding.

Generally speaking, the organic polymer used in accordance with the invention possesses a spongelike or porous structure, in particular a structure having cavities. The inorganic particulate solids are then incorporated into this spongelike or porous structure, the inorganic particulate solids generally being bonded, more particularly physically bonded, to the organic polymer, something which in general is realized by adding the inorganic particulate solids to the polymerization batch during the preparation of the organic polymer employed.

As observed above, the organic polymer used in accordance with the invention is generally biocompatible in form, in particular biologically degradable, preferably degradable on exposure to microorganisms, and, moreover, is of bioavailable form. In order to achieve a good water uptake capacity and/or water storage capacity, the organic polymer used is generally hydrophilic in form.

In an inventively advantageous way, the organic polymer used is generally formed on the basis of at least one superabsorbent polymer (SAP). Unlike conventional superabsorbent polymers, however, for the reasons given above, a superabsorbent polymer is used that is modified with carbohydrate-based structural units.

In accordance with the invention it is preferred if the organic polymer is a homopolymer and/or copolymer of at least one ethylenically unsaturated organic compound, in particular of acrylic acid, methacrylic acid or derivatives thereof.

It is particularly preferred if the organic polymer is a carboxyl-containing polymer.

The organic polymer used derives in particular from at least one unsaturated carboxylic acid. This may be an aliphatic, aromatic-aliphatic or aromatic unsaturated carboxylic acid, preferably an aliphatic unsaturated carboxylic acid, in particular an unsaturated $C_2$-$C_{20}$ carboxylic acid, which with particular preference is selected from the group consisting of acrylic acid, methacrylic acid, and also the mixtures and derivatives thereof, more particularly esters, and with particular preference from the group consisting of acrylic acid and derivatives thereof, more particularly esters.

In an inventively particularly preferred way, the organic polymer is a polyacrylate or polymethacrylate, preferably a crosslinked, more particularly structurally crosslinked polyacrylate or polymethacrylate, very preferably a more particularly crosslinked, preferably structurally crosslinked polyacrylate.

As observed above, the carbohydrate-based structural units may be condensed onto the organic polymer, in particular by means of esterification.

In an inventively preferred way, in the case where carboxyl-containing organic polymers are used (e.g., polyacrylates and/or polymethacrylates), the carbohydrate-based structural units are bonded via the carboxylic acid functions of the polymer to the organic polymer, preferably by means of condensation, in particular by means of esterification. In this case at least 3%, preferably at least 5%, more preferably at least 10%, and/or in particular up to 80%, preferably up to 50%, more preferably up to 25%, of the carboxylic acid functions of the organic polymer ought to be esterified with carbohydrate-based structural units. In the context of the present invention it has proven advantageous if 3% to 80%, preferably 5% to 50%, more preferably 10% to 25% of the carboxylic acid functions of the organic polymer are esterified with carbohydrate-based structural units.

According to one inventively preferred embodiment the organic polymer is a more particularly crosslinked, preferably intercrosslinked polyacrylate or polymethacrylate, wherein at least 3%, preferably at least 5%, more preferably at least 10%, and/or in particular up to 80%, preferably up to 50%, more preferably up to 25% of the carboxylic acid functions of the organic polymer are esterified with carbohydrate-based structural units. Advantageously 3% to 80%, preferably 5% to 50%, more preferably 10% to 25% of the carboxylic acid functions of the organic polymer are esterified with carbohydrate-based structural units.

The partial esterification of the carboxylic acid functions vastly increases the alkaline earth metal susceptibility of the soil improver of the invention in relation to products exclusively having free carboxylic acid functions.

In principle the amount of carbohydrate-based structural units in the organic polymer employed may vary within wide limits. It has proven particularly advantageous if the organic polymer employed comprises carbohydrate-based structural units in an organic polymer/carbohydrate-based structural units weight ratio ≥1:1, in particular ≥2:1, preferably ≥2.5:1, more preferably ≥3:1, very preferably ≥4:1. Generally speaking, the organic polymer ought to comprise carbohydrate-based structural units in an organic polymer/carbohydrate-based structural units weight ratio in the range from 1:1 to 50:1, in particular 2:1 to 20:1, preferably 3:1 to 10:1, more preferably 4:1 to 6:1. Nevertheless, for particular applications or in individual cases, it may be necessary to deviate from the values stated above, without departing the scope of the present invention. The aforesaid value ranges result on the one hand from the fact that the swelling behavior can be controlled in a targeted way by way of the carbohydrate-based structural units, although this swelling behavior ought not to be excessively pronounced, and, on the other hand, a certain residual acidity ought to be provided, in the context of use in the soils in question, particularly for buffer purposes.

According to one inventively particularly preferred embodiment, the organic polymer employed is a more particularly crosslinked, preferably intercrosslinked polyacrylate or polymethacrylate, preferably polyacrylate, wherein the organic polymer comprises carbohydrate-based structural units in an organic polymer/carbohydrate-based structural units weight ratio ≥1:1, in particular ≥2:1, preferably ≥2.5:1, more preferably ≥3:1, very preferably ≥4:1. Preferably the organic polymer comprises carbohydrate-based structural units in an organic polymer/carbohydrate-based structural units weight ratio in the range from 1:1 to 50:1, in particular 2:1 to 20:1, preferably 3:1 to 10:1, more preferably 4:1 to 6:1.

For the reasons stated above it has proven advantageous if the soil improver of the invention comprises carbohydrate-based structural units, relative to the soil improver, in amounts of 0.1% to 40% by weight, in particular 0.2% to 30% by weight, preferably 0.5% to 25% by weight, more preferably 1% to 10% by weight.

As far as the carbohydrate-based structural units are concerned, they may in principle be of like or different type in form within the organic polymer. In the case of structural units that are different from one another, there may be at least two, preferably at least three, structural units present that are different from one another.

In particular, the carbohydrate-based structural units may be formed on the basis of saccharidic compounds, in particular from the group consisting of mono-, di-, oligo-, and polysaccharides and mixtures thereof.

Regarding the general term carbohydrates and also saccharides, more particularly mono-, di-, oligo-, and polysaccharides, reference may be made, for example, to Römpp Chemielexikon, 10th edition, Georg Thieme Verlag Stuttgart/New York, 1996 to 1999, with the relevant entry headings referenced therein.

The carbohydrate-based structural units are preferably formed on the basis of organic compounds having a hemiacetal-forming carbonyl group and simultaneously two or more hydroxyl groups in the molecule, more particularly on the basis of polyhydroxyaldehydes (aldoses) and polyhydroxyketones (ketoses), and also compounds derived therefrom, and also the oligo- and polycondensates thereof. Particular preference is given to sugars and sugar derivatives, this term being under-stood in the language of the art to refer to mono-, di-, oligo-, and polysaccharidic compounds of the above-stated type (cf., e.g., Römpp Chemielexikon, 10th edition, Georg Thieme Verlag Stuttgart/New York, volume 6, 1999, pages 5096 to 5103).

In an inventively particularly preferred way, the carbohydrate-based structural units are formed on the basis of compounds from the group consisting of glucose; sucrose; cellulose and cellulose derivatives, more particularly cellulose ethers and cellulose esters; starch and starch derivatives, more particularly starch ethers; molasses; and also mixtures thereof. For further details of the aforementioned compounds, reference may be made to the corresponding locations in Römpp Chemielexikon, 10th edition, Georg Thieme Verlag Stuttgart/New York, 1996 to 1999, more particularly with the entry headings "cellulose", "cellulose esters", "cellulose ethers", "D-glucose", "molasses", "sucrose", "starch", "starch derivatives", and "starch ethers".

Equally, the carbohydrate-based structural units of the organic polymer used may be formed on the basis of glycans, preferably homoglycans, especially those of the aforementioned type (e.g., cellulose and cellulose derivatives, starch and starch derivatives, and also glycogen).

As far as the inorganic particulate solids employed are concerned, it is possible in principle for inorganic particulate solids that are alike, or else mixtures of inorganic particulate solids that are different from one another, to be present in the soil improver. In the case of inorganic particulate solids that are different from one another it is possible, for example, for there to be at least two, preferably at least three kinds of inorganic particulate solids present that are different from one another.

The inorganic solid is more particularly selected from mineral rocks, more particularly finely ground rocks (i.e., mineral rocks in finely milled form). For example, the inorganic solid may be selected from the group consisting of basalt, bentonite, pumice, calcite, carbonate rocks, diabase, dolomite, eruptive rocks, feldspar, ground glass, glasses, mica, gneiss, graywacke, siliceous earths, kieselguhr, silica, chalk, lavaform rocks, magnesite, metal oxide rocks, meteorite rocks, montmorillonite, pyrite, quartz, arenaceous quartz, slate, sedimentary rocks, silicatic rocks, sulfatic rocks, clays, argillaceous rocks, trass, tufas, tuffs, volcanic ashes, volcanic rocks, and mixtures thereof.

As described above, the inorganic particulate solids are typically incorporated into matrix material formed by the organic polymer. Here, the inorganic particulate solids may be bonded, more particularly physically bonded, to the matrix material formed by the organic polymer, by the addition, for example, of the corresponding inorganic particulate solids to the polymerization batch during the preparation of the organic polymer employed.

The amount of inorganic filler particles in the soil improver of the invention may vary within wide limits. It has been found advantageous if the inorganic filler particles are present in amounts of 10% to 90% by weight, in particular 30% to 80% by weight, preferably 50% to 75% by weight, based on the soil improver. Nevertheless, in certain cases and in particular applications, it may possibly be necessary to deviate from the aforementioned amounts, without departing the scope of the present invention.

Generally speaking, the inorganic filler particles employed have particle or grain sizes (absolute) ≥2000 μm, in particular ≥1000 μm, preferably ≥500 μm, more preferably ≥250 μm; herein at least 90%, preferably at least 95%, more preferably at least 99%, of the inorganic filler particles ought to lie within the aforesaid values range. In particular, the inorganic filler particles have particle or grain sizes (absolute) in the range from 1 nm to 2000 in particular 10 nm to 1000 μm, preferably 20 nm to 500 μm, more preferably 50 nm to 25 μm; herein at least 90%, preferably at least 95%, more preferably at least 99% of the inorganic filler particles ought to lie within the aforesaid values range. This produces great ease of incorporation into the polymer matrix, and also good bioavailability.

As far as the residual monomer content of the soil improver of the invention is concerned, which can be attributed to the preparation of the organic polymer employed, it ought to be very low, since relatively high residual monomer contents are detrimental in relation to plant growth. Accordingly, the residual monomer content of the soil improver of the invention, relative to the soil improver, ought to be less than 1% by weight, in particular less than 0.5% by weight, preferably less than 0.3% by weight, more preferably less than 0.1% by weight.

Generally speaking, the soil improver of the invention is of free-flowing form, more particularly flowable form. This has the advantage that it can be incorporated effectively into the soils for treatment.

The ease of incorporation of the soil improver of the invention can be brought about as well, in particular, by processing the soil improver of the invention to shaped bodies, more particularly pellets, grains, beads, granules, slivers, flakes or the like.

Generally speaking, the soil improver of the invention has a bulk density in the range from 200 to 900 g/l, in particular 500 to 800 g/l, preferably 550 to 750 g/l, more preferably 600 to 700 g/l.

The soil improver of the invention has a pH on addition of water in the range from 4 to 8, in particular 5 to 7. Hence it is made biocompatible.

As far as the conductivity of the soil improver of the invention is concerned, it is below 2000 $\mu S/cm$, in particular below 1500 $\mu S/cm$, preferably below 1000 $\mu S/cm$.

The soil improver of the invention is preferentially particulate in form. In this context, the particle size or grain size (absolute) ought to be in the range from 0.01 to 20 mm, in particular 0.1 to 10 mm, preferably 1 to 8 mm; at least 90%, preferably at least 95%, more preferably at least 99% of the particles of the soil improver preferably have particle or grain sizes within the aforesaid values range. In this way it is possible to produce great ease of incorporation of the soil improver of the invention.

An outstanding characteristic of the soil improver of the invention is its swelling behavior, which is time-dependent. In particular, the soil improver of the invention exhibits a water uptake within an hour of at least 10 times, in particular at least 15 times, preferably at least 20 times, more preferably at least 25 times, its own weight. Particularly noteworthy in this context is that the soil improver of the invention possesses a reversible water uptake capacity and/or water storage capacity, which enables the soil improver of the invention to deliver the taken-up or stored water to the vegetation or plant stock in the event of need.

Generally speaking, the soil improver of the invention possesses a weight-related water uptake capacity overall, relative to the intrinsic weight of the soil improver, of at least 1000%, in particular at least 2000%, preferably at least 2500%, more preferably at least 3000%.

Additionally, provision may be made for the soil improver of the invention further to comprise at least one other adjuvant. Said adjuvant may be selected, for example, from the group consisting of plant growth promoting or regulating substances, fertilizers, microorganisms, fungi, algae, yeasts, fungicides, herbicides, pesticides, and also mixtures of the aforesaid substances. The relevant amount of other adjuvant may vary within wide amounts and may be, for example, 0.0001% to 10% by weight, in particular 0.001% to 5% by weight relative to the soil improver.

The soil improver of the invention may further comprise, moreover, at least one additional, more particularly water-soluble or water-dispersible additive. Said additive may be selected in particular from the group consisting of alkali metal or alkaline earth metal silicates, carbonates, hydroxides, oxides, nitrates, phosphates, and borates; boric acid; phosphoric acid; uric acid; urea; guanidine; polyols, more particularly glycols; starch and starch derivatives; cellulose and cellulose derivatives; polysaccharides; and also mixtures thereof. The amount of the aforementioned additive may equally vary in wide limits and may be, for example, 0.001% to 20% by weight, in particular 0.01% to 10% by weight relative to the soil improver of the invention.

Furthermore, the soil improver of the invention may further comprise at least one water-insoluble filler, which may be selected, for example, from the group consisting of wood, straw, peat, paper, granulated plastics, granulated recyclates, paper, fiber substances, textile materials, and also mixtures thereof, in which context the amounts of said filler that may be employed may equally vary within wide limits and may be, for example, 0.01% to 20% by weight, in particular 0.1% to 10% by weight.

When it is delivered, the soil improver is adjusted advantageously to a residual moisture content of at least 0.01% by weight, preferably at least 0.1% by weight, it being possible for this residual moisture content to take on values of up to 80% by weight, in particular up to 60% by weight, preferably up to 35% by weight, more preferably up to 30% by weight, and the aforesaid weight indications relate in each case to the total weight of the soil improver containing residual moisture.

As already outlined, a multiplicity of advantages are associated with the soil improver of the invention.

Provided in the context of the present invention is a material which binds solids and/or liquids and is based on a polymer (e.g., based on acrylic acid), and which, so to speak, functions as a binder for the aforementioned substances, is able to bind water into its matrix, and can therefore be employed as a soil auxiliary substance (e.g., as a water store, as a storage medium for fertilizers, biocides, nutrients, etc., as a dust-binding agent, or the like).

In the context of the present invention, accordingly, success has been achieved in developing a product which is capable on the one hand of uniting the various solid and liquid components with one another to form a homogeneous product—as a binder, so to speak—and on the other hand of maintaining a water storage medium ability.

Through the use of carbohydrates as structural units in the polymers employed, these carbohydrates are bound homogeneously into the polymer matrix, which is capable of storing water reversibly and also delivering it to the environment again in the event of need.

A core section of the present invention in the chemical sector is therefore inter alia the use of carbohydrates in the polymerization process for preparing the soil improver of the invention. The chemical bonding of the carbohydrates to the polymers, such as polymers based on (meth)acrylic acid, for example, is accomplished, for example, by a condensation reaction during the polymerization operation. Various organic and inorganic adjuvants and additives, including mineral solids (e.g., finely ground rocks, finely ground glass, sand, etc.), for example, may additionally be bound in the polymer matrix, so producing a homogeneous product.

The use of carbohydrates in the polymerization operation is beneficial to the biological degradability of the product. Through variance in the carbohydrates and amounts of carbohydrate employed, it is possible to control the degradability in a targeted way.

On the basis of this preparation operation, the pore structure of the product is unitary and uniform. As a result, the water uptake capacity of the material is optimized. A further result is improved release kinetics for the substances used.

Depending on the nature of the solids used, it is possible in this way to generate a product which is specific in terms of its intended field of application.

As dust-binding agents in the sports segment, for example, polymers have found only limited use to date on account of their gellike structure (e.g., hydrogels). Through the combination of a polymer matrix with inorganic solids it is possible for the first time to generate a structurally stable and elastic product which on the one hand stores water sufficiently to bind the resultant dust and on the other hand is locationally stable on the basis of its ingredients. For use as soil auxiliary substance, solids are selected which are in each case beneficial in their effects on the properties of the soil (e.g., in the case of deficiency symptoms); particularly noteworthy in this context are substances which promote the growth of plants or which improve the soil (in respect of future envisioned uses, for example).

In view of the preparation operation described herein, using carbohydrates, there is no need for the ascorbic acid catalyst that is typically used in polymerizations of this type that are initiated free-radically. In the state of the art, ascorbic acid ensures that polymerizations could be initiated in the first place even in the case of monomer mixtures which are cooled below room temperature. Accordingly, within the polymerization batch, the carbohydrates fulfill functional and physical properties which are not present in the case of ascorbic acid.

The invention accordingly provides structurally stable, polymeric, inorganic-organic, hybrid or composite materials for use in the soil, for the purpose, for example, first of reversibly storing an additional quantity of plant-available water therein and secondly of improving the properties of the soil, through provision and/or mediation of (additional) nutrients, fertilizers, biocides, etc., and particularly of increasing or improving the soil fertility. In this context, superabsorbent polymers are employed in particular.

While superabsorbent polymers were to start with preferentially products for the hygiene sector, as outlined at the outset, whose water storage capacity it was desired to use usefully in agriculture as well, it was soon recognized, nevertheless, that their spectrum of properties was too single-faceted for that field of use. As a consequence of this, superabsorbents were used only to a small degree. Disadvantages effecting these polymers in the context of soil use were, for example, their lack of structural stability, owing to the gellike properties in the swollen state; the loss of swellability in the presence of alkaline earth metals; and decomposition due to UV radiation.

In the context of the present invention, success has been achieved, as a consequence of the attachment of the carbohydrate-based structural unit to the polymeric matrix, in ensuring improved biological degradability and, in the case of an associated increase in the hydrophilic nature, in raising the swellability of the material at the same time. Moreover, the disadvantages relating to the development of a pore structure are eliminated relative to existing processes, and so the water uptake capacity, which is also associated with the number of pores present per unit volume, is increased.

Through the use of the aforementioned components in the polymerization reaction, the possibility has been created of being able to carry out polymerization more independently of the petroleum-based raw materials, which are becoming increasingly scarce, and at the same time of guaranteeing consistent and/or improved quality with regard to the product properties required for use in soils.

In the context of the present invention, moreover, an alkali-resistant product is provided, which can still be employed in soils that have a high chalk content and/or lime content, but that significantly impair the swellability of the traditional superabsorbents and inadequately neutralized products, especially products produced by conventional processes.

The result is a new inorganic-organic product class which provides a uniformly fine pore structure in the desired sense and, furthermore, influences density, elasticity, hardness, and water uptake capacity, and achieves this for water of high hardness and for water of high conductivity.

In addition, the mineral fraction of the composite material of the invention is supplemented by a hitherto unemployed substance, which gives the product as a whole a neutral nature—namely, the carbohydrate-based structural units.

On the one hand, within the polymerization reaction, the grafting or condensing of a natural substance (carbohydrate) onto a synthetic polymer produces a product having enhanced hydrophilicity and featuring boosted water uptake capacity. On the other hand, furthermore, the use of a natural substance increases the biological degradability. Finally, the use of inorganic particulate solids, such as finely milled or finely ground glass (e.g., "simple type", i.e., without heavy metals), produces an absolutely neutral, structurally stable, inert composite material. By using the carbohydrate there is also no need to use the ascorbic acid catalyst that is frequently used generally for polymerizations, and, as a result, the preparation process can be simplified.

A feature of the existing polymerizations of the prior art is that the polymers based on crosslinked hydrophilic homopolymers and copolymers are prepared from ethylenically unsaturated, polymerizable monomers containing acid groups. The innovation in the context of the present invention, in contrast, is that monomers containing acid groups are not used exclusively in the actual polymerization reaction, but that instead a certain fraction is replaced by a carbohydrate (e.g., sucrose). This substitution not only solves the stated problems concerning the pore structure, but also solves those relating to the biological degradability and the swelling properties. With regard to the swelling properties, moreover, the material becomes more resistant to the negative influence of salt loads and harmful ions.

The disadvantages of the products described and produced according to WO 03/000621 A1, for example, can therefore—unexpectedly—be eliminated by using hitherto ignored substances which are simply added to the mineral-containing monomer solution to be polymerized.

Also surprising, in particular, is that the carbohydrate—unaffected by the degree of neutralization of the monomer mixture to be polymerized—produces a very fine-pored and hydrophilic product. Also surprising is the fact that the ascorbic acid catalyst which it is likewise necessary to use in polymerizations of the present kind can be dispensed with (According to the prior art, ascorbic acid allows polymerizations to be initiated in the first place even in the case of monomer mixtures which are cooled below room temperature.). Accordingly, within the polymerization batch, the carbohydrate fulfils functional and physical properties which are not present in the case of ascorbic acid.

The desired adjustment of the respective quantitative proportion and mixing ratio (i.e., polymer fraction, fraction of carbohydrates, fractions of natural minerals, etc.) is ultimately determined by the soil conditions under which the composite material of the invention is to be employed. The carbohydrate fraction ought also to be guided, additionally, by the amount of monomer used, and should generally not exceed said amount.

The soil improver of the invention is produced, in the context of the present invention, by means of polymerization of suitable starting polymers in a manner known per se to the skilled person (e.g., free-radical polymerization in aqueous solution or dispersion, with adjustment to the appropriate pH), the polymerization being carried out in the presence of the carbohydrate, which produces the esterification in situ, and also in the presence of the other ingredients (i.e., inorganic particulate solids and, where used, further additives and/or adjuvants of the aforementioned kind), and the polymerization can be initiated using initiators that are known per se, more particularly free-radical initiators. For further relevant details, reference may also be made to the working examples.

Further provided by the present invention—according to a second aspect of the present invention—is the use of the above-described soil improver, as such use is described in the relevant use claims.

Thus, the soil improver of the invention can be employed in particular for improving soil quality, preferably for increasing the water uptake capacity and/or water storage capacity of soils and/or for loosening soils. As well as the increase in the water uptake capacity and/or water storage capacity of the soil treated with the soil improver of the invention, the improved soil loosening, more particularly aeration, is deserving of particular emphasis.

Accordingly, the soil improver of the invention is suitable, for example, for use in agriculture, in viti culture, horticulture, and landscaping, for sports, golf, gardening, lawn, and riding areas, and also for green roofing.

The soil improver of the invention is suitable, furthermore, for land consolidation (e.g., on slopes, etc.), for combating desertification in arid regions, or for promoting and regulating plant growth.

For example, the soil improver of the invention can be employed as a reversible water store and, if desired, active ingredients store, in particular in combination with the further aforementioned ingredients such as herbicides, pesticides, fungicides, fertilizers, plant growth accelerators and regulators, and also microorganisms.

As outlined above, therefore, the soil improver of the invention opens up a host of possible applications: Accordingly, the soil improver of the invention can be employed in principle in all sectors in which plants may grow. The soil improver of the invention can be employed as a pure planting substrate or else, as outlined above, as an additive to soils or other installations which serve for plant growth (e.g., fiber constructions, such as mats, fleeces, etc., for example, made of natural and/or synthetic materials). Furthermore, the soil improver of the invention may find application as an additive for soils for the purpose of improving the soil properties and for reducing dust, as for example in sports arenas, on riding areas, horseracing tracks and dog racing tracks, speedway arenas, etc.

Moreover, the soil improver of the invention can also be employed as a germination accelerator in combination with seed.

In the context of its use, the soil improver is, in particular, incorporated into the soil, advantageously by mixing with the soil for treatment.

In order to obtain a significant improvement effect, the soil improver of the invention ought to be used in an amount of 10 to 1000 g/m$^2$, in particular 50 to 500 g/m$^2$, preferably 75 to 300 g/m$^2$, more preferably 100 to 250 g/m$^2$, relative to the area of soil for treatment.

Generally speaking, the soil improver of the invention, relative to the amount of soil for treatment, is used in an amount of 0.001% to 20% by weight, in particular 0.01% to 10% by weight, preferably 0.05% to 5% by weight, more preferably 0.1% to 3% by weight.

If the soil improver of the invention is used, for example, as a planting substrate, it can be employed, for example, in bulk, i.e., at 100%, or else may be used together with the constructions and installations serving for plant growth.

Further embodiments, modifications, and variations of the present invention are readily apparent and realizable to the skilled person on a reading of the description, without that person departing the scope of the present invention.

The present invention is illustrated using the working examples below, which are not, however, intended to limit the present invention in any way whatsoever.

WORKING EXAMPLES

Example 1

Production of an Inventive, Molasses-Modified Soil Improver

Introduced into a conical plastic vessel having a capacity of around 1 liter are 162 g of mains water with a hardness of 20° dH [German hardness], with 4.4 g of urea dissolved therein, and 100 g of acrylic acid. Thereafter, this mixture is admixed with 34.0 g of potassium hydroxide solution (50.0% strength by weight) and 14.0 g of potassium silicate, and also 10.0 g of molasses. After this solution has been cooled to below 10° C., a minerals mixture composed of 124.0 g of fine arenaceous quartz, 124.0 g of Eifelgold, and 62.0 g of bentonite is stirred into this solution. Lastly, 0.4 g of the crosslinker butane-1,4-diol diacrylate is added. Thereafter, stirring is carried out again, and the polymerization is initiated with 0.06 g of potassium disulfite and 1.62 g of sodium peroxydisulfate, in each case as saturated solutions, under initial vigorous stirring. Within a few minutes, the material fills the entire plastic vessel, and even forms a mushroom formation over the vessel.

After it has cooled, the block of polymer is removed and a small sliver cut from it, with a weight of 1.2 g, is placed in 20° dH mains water. The weight increase per unit time is evident from table 1 below.

The remaining material is dried to a residual moisture content of around 30% and then ground (grain size: 2 to 6 mm). The bulk density is 650 to 680 g/l, the pH (10% water) is 5 to 7, and the conductivity is below 1000 µS/cm. The residual monomer content is below 0.1% by weight. Half of the batch resulting in this way is processed into shaped bodies (pellets of around 10 mm).

Example 2

Production of a Further Inventive, Molasses-Modified Soil Improver with Varied Inorganic Solid and Lower Molasses Fraction The same batch as in example 1 is used, but, instead of fine sand, a 1:1 mixture of sand/finely ground glass is used, and only 10 g of molasses is used. The finely ground glass is ST 220 glass (Reidt GmbH & Co. KG, Stolberg, Germany).

After it has cooled, the block of polymer is removed, and a small sliver cut from it, with a weight of 1.2 g, is placed in 20° dH mains water. The weight increase per unit time is apparent from table 1 below.

Example 3

Preparation of Yet Another Inventive, Molasses-Modified Soil Improver, with Further Reduced Molasses Fraction The same batch as in example 2 is used, but only 5 g of molasses are used. After it has cooled, the polymer block is removed and a small sliver cut from it, with a weight of 1.2 g, is placed in 20° dH mains water. The weight increase per unit time is apparent from table 1 below.

Example 4

Production of a Noninventive Soil Improver without Molasses Fraction

The same batch as in example 3 is used, but no molasses at all is used, i.e. the molasses fraction is omitted entirely. After it has cooled, the block of polymer is removed, and a small sliver cut from it, with a weight of 1.2 g, is placed in 20° dH mains water. The weight increase per unit time is apparent from table 1 below.

TABLE 1

Weight increase of chiplike slivers weighing 1.2 g in mains water (20° dH) (all specimens cut to the same weight in each case)

| Time/h | 3.25 | 4.92 | 7.5 | 9.5 | 12.5 | 22.5 | 25.25 | 34.5 | 67.5 |
|---|---|---|---|---|---|---|---|---|---|
| Example 1 H$_2$O uptake in g (inventive) | 24 | 34 | 48 | 58 | 68 | 86 | 88 | 104 | 60 |
| Example 2 H$_2$O uptake in g (inventive) | 22 | 32 | 44 | 52 | 62 | 72 | 80 | 94 | 144 |
| Example 3 H$_2$O uptake in g (inventive) | 14 | 20 | 26 | 32 | 42 | 66 | 72 | 86 | 138 |
| Example 4 H$_2$O uptake in g (comparative) | 8 | 14 | 18 | 21 | 24 | 28 | 35 | 41 | 42 |

From table 1 it is evident that the swelling capacity of the soil improvers of the invention is molasses-dependent and is in no way exhausted within the observation period. In the case of the noninventive example, moreover, the swelling capacity is significantly reduced, and is already (virtually) exhausted within the observation period.

In all four working examples, the inorganic particulate solids used have grain sizes of below 200 µm.

Examples 5A-C, 6A-C and 7A-C

Production of Further Inventive Soil Improvers

Examples 1 to 3 are repeated, but replacing molasses by cellulose (examples 5A, 5B, and 5C) or starch (examples 6A, 6B, and 6C) or 1:1 starch/cellulose mixture (example 7A, 7B, and 7C).

Example 8

Production of an Inventive Soil Improver with Molasses Fraction

The same batch as in example 1 is used, but the starting components are combined and this mixture is run through a preparative extruder. The polymerization in the extruder is initiated with addition of potassium disulfite solution and sodium peroxydisulfate solution.

Example 9

Vegetation Trials with Cress

Using the procedure described above, three different inventive soil improvers containing different amounts of carbohydrate-based structural units (specifically: cellulose) are produced in amounts of 5% by weight or 7.5% by weight or 10% by weight of carbohydrate-based structural unit, relative to the inventive soil improver (dry weight). For comparison, a noninventive soil improver is used without carbohydrate-based structural units, in accordance with WO 2006/119828 A1 (working example 1).

The soil improvers are each mixed in amounts of around 15% by weight with top soil, and saturated for 24 hours maximally with water. Then cress is introduced as seed. In all three inventive soil improvers, and also in the case of the noninventive soil improver, initial germination is observed after 12 hours, and, after three days, the formation of a vigorously green, continuous covering of the cress has reached its conclusion. After a further 3 days, the green covering, following further growth of the cress, is retained in its full extent for all of the three inventive soil improvers, whereas, in the case of the noninventive soil improver, the cress has become wilted and the roots are rotted or colored brown. Whereas, in the case of the three inventive soil improvers, a moist, structured soil is present with white, vital roots, the consistency in the case of the noninventive soil improvers is gelatinous to slimy, thus explaining the rotting of the roots as a consequence of deficient air supply.

The above example is repeated, but this time with the various soil improvers used as pure planting substrates in bulk (i.e., at 100%) together with a fiber mat support. Here, the difference is even more marked: in the case of the noninventive soil improver, severe gelling occurs after just three days, and so root rot occurs as soon as the fourth day, whereas, in the case of the present invention, root formation is unaffected even after six days, and a continuously green area is present.

The above working example demonstrates the superiority of the soil improvers of the invention with carbohydrate-based structural units, with partial esterification of the carboxyl groups, in relation to prior-art soil improvers only having free carboxyl groups in the organic polymer, without esterification with carbohydrate-containing structural units.

Example 10

Further Vegetation Trials with Corn

Three further inventive soil improvers based on polyacrylate, with differing amounts of carbohydrate-based structural units (weight fraction of carbohydrate-based structural units [in this case: starch] in relation to the organic polymer: 20% by weight or 30% by weight or 40% by weight), and also a noninventive working example without carbohydrate-based structural units (working example 2 according to WO 2006/

119828 A1), are tested in comparison. For this purpose, a very low-yield corn field with a total area of 10 000 m², with sandy soil, is divided into five equal plots each of 2000 m². While the first plot serves as a reference and is not treated with a soil improver, the remaining four plots are each treated with the above-stated soil improvers (i.e., three inventive soil improvers and one noninventive soil improver) (around 200 g/m² in each case). The yield (harvest) from the reference plot is taken with a reference value of 1.

After the end of the vegetation period, an increase in yield to a value of 6.1 or 7.5 or 10.0 (relative to reference value of 1) is achieved with the first and second and third inventive soil improvers, respectively, whereas the corresponding value for the noninventive soil improver is only 2.5 (based in each case on the reference plot). Moreover, in the case of the three inventive soil improvers, the vegetation period is shortened by around 20% or 35% or 40% respectively, but the corresponding figure for the noninventive soil improver is only around 0.5%. This demonstrates that the polymers modified with carbohydrate-based structural units in the soil improvers in question produce a significant improvement in increased yields and shortened vegetation period as compared with those soil improvers which have, as their organic polymers, unmodified organic polymers containing free carboxyl groups. In the case of the inventive soil improvers, the inventive soil improvers have degraded after one year to an extent of 60% or 63% or 67.5%, whereas in the case of the noninventive soil improver, 100% is still detectable after one year, which demonstrates the poorer bioavailability and biodegradability of the noninventive soil improver. The above trials likewise demonstrate that a significant control can be achieved via the amount of carbohydrate-based structural units, more particularly via the organic polymer/carbohydrate-based structural units weight ratio.

Example 11

Still Further Vegetation Trials with Corn

In accordance with example 10, a further four inventive soil improvers based on polyacrylate, with different amounts of carbohydrate-based structural units (organic polymer/carbohydrate-based structural units weight ratio 1:2 or 1:1 or 2:1, or 3:1) are tested. For this purpose, a very low-yield cornfield of around 5000 m² in total area, with sandy soil, is divided into five equal plots each of around 1000 m². Whereas the first plot serves as a reference and is not treated with any soil improver, the remaining four plots are treated with each of the aforementioned soil improvers (i.e., four inventive soil improvers) (around 235 g/m² in each case). The yield (harvest) from the reference plot is taken with a reference value of 1. After the end of the vegetation period, an increase in yield to a value of 4.3 or 6.5 or 7 or 7.2 (relative to reference value of 1) is achieved in the case of the first and second and third and fourth soil improvers respectively in each case relative to the reference plot. With the four inventive soil improvers, moreover, the vegetation period is shortened by about 25% or 30% or 38% or 40%. Via the amount of carbohydrate-based structural units, more particularly via the organic polymer/carbohydrate-based structural units weight ratio, it is possible to achieve a significant control in relation to soil improvement. The best results are obtained for an organic polymer/carbohydrate-based structural units weight ratio ≥1:1.

The invention claimed is:

1. A soil improver, comprising:
    a) a water-swellable matrix material based on carbohydrate-based structural units chemically bonded to at least one organic polymer, said organic polymer based on ethylenically unsaturated carboxylic acid structural units, and
    b) inorganic particulate solids included within the matrix material,
        wherein the organic polymer of the water-swellable matrix material is bonded to the carbohydrate-based structural units through carbohydrate-based functional groups.

2. The soil improver of claim 1, wherein the water-swellable matrix material is a copolymer selected from the group consisting of a graft copolymer, a condensation copolymer, and combinations thereof, and wherein the organic polymer is a cross linked organic polymer crosslinked through a difunctional crosslinker.

3. The soil improver of claim 1, wherein the organic polymer possesses a porous structure having cavities, wherein the inorganic particulate solids are included in the organic polymer and/or wherein the inorganic particulate solids are bonded to the organic polymer.

4. The soil improver of claim 1, characterized in that the organic polymer is biocompatible and/or biodegradable in form on exposure to microorganisms and wherein the organic polymer is hydrophilic in form.

5. The soil improver of claim 1, wherein the organic polymer is formed on the basis of at least one superabsorbent polymer (SAP), wherein the organic polymer is a homopolymer and/or copolymer of at least one ethylenically unsaturated carboxylic acid selected from the group consisting of acrylic acid, methacrylic acid or derivatives thereof, and wherein the organic polymer is a carboxyl-containing polymer.

6. The soil improver of claim 1, wherein the organic polymer is a polyacrylate or a polymethacrylate.

7. The soil improver of claim 1, wherein the carbohydrate-based structural units are connected to the organic polymer through an ester group.

8. The soil improver of claim 1, wherein the soil improver comprises carbohydrate-based structural units, relative to the soil improver, in amounts of 0.1% to 40% by weight.

9. The soil improver of claim 1, wherein the carbohydrate-based structural units are formed on the basis of saccharidic compounds.

10. The soil improver of claim 1, wherein the carbohydrate-based structural units are formed on the basis of organic compounds having a hemiacetal-forming carbonyl group and simultaneously two or more hydroxyl groups in the molecule.

11. The soil improver of claim 1, wherein the carbohydrate-based structural units are formed on the basis of compounds which are selected from the group consisting of glucose; sucrose; cellulose and cellulose derivatives; cellulose ethers and cellulose esters; starch and starch derivatives; starch ethers; molasses; and mixtures thereof.

12. The soil improver of claim 1, wherein the carbohydrate-based structural units are formed on the basis of glycans.

13. The soil improver of claim 1, wherein the inorganic solid is a mineral rock selected from the group consisting of basalt, bentonite, pumice, calcite, carbonate rocks, diabase, dolomite, eruptive rocks, feldspar, ground glass, glasses, mica, gneiss, graywacke, siliceous earths, kieselguhr, silica, chalk, lavaform rocks, magnesite, metal oxide rocks, meteorite rocks, montmorillonite, pyrite, quartz, arenaceous quartz, slate, sedimentary rocks, silicatic rocks, sulfatic rocks, clays, argillaceous rocks, trass, tufas, tuffs, volcanic ashes, volcanic rocks, and mixtures thereof.

14. The soil improver of claim 1, wherein the inorganic particulate solids are included in the matrix material formed by the organic polymer and/or wherein that the inorganic particulate solids are bonded to the matrix material formed by the organic polymer.

15. The soil improver of claim 1, wherein the inorganic particulate solids are present in amounts of 10% to 90% by weight, and wherein the inorganic particulate solids have absolute particle sizes ≤2000 μm.

16. The soil improver of claim 1, wherein the soil improver, relative to the soil improver, has a residual monomer content of less than 1% by weight.

17. The soil improver of claim 1, wherein the soil improver is particulate in form and has an absolute grain size in the range from 0.01 to 20 mm and wherein the soil improver has a weight-related water uptake capacity overall, relative to the weight of the soil improver, of at least 1000%.

18. The soil improver of claim 1, wherein the organic polymer is crosslinked and includes carbohydrate-based structural units in an organic polymer/carbohydrate-based structural units weight ratio ≥1:1.

19. A method of using a soil improver of claim 1 for improving soil quality and/or for increasing the water uptake capacity and/or water storage capacity of soils and/or for loosening soils, wherein the soil improver is incorporated into the soil and mixed therewith and wherein the soil improver is used in an amount of 10 to 1000 g/m$^2$, relative to the soil area for treatment.

\* \* \* \* \*